(12) United States Patent
Mantripragada et al.

(10) Patent No.: US 7,127,458 B1
(45) Date of Patent: Oct. 24, 2006

(54) MATCHING AND CLEANSING OF PART DATA

(75) Inventors: Ramakrishna Mantripragada, Sunnyvale, CA (US); Sridevi V. Ganugapati, Mountain View, CA (US); John I. Fors, Menlo Park, CA (US); Larry A. Recht, Newport Beach, CA (US)

(73) Assignee: i2 Technologies US, Inc., Dallas, TX (US)

( * ) Notice: Subject to any disclaimer, the term of this patent is extended or adjusted under 35 U.S.C. 154(b) by 500 days.

(21) Appl. No.: 10/175,562

(22) Filed: Jun. 17, 2002

Related U.S. Application Data

(60) Provisional application No. 60/298,635, filed on Jun. 15, 2001.

(51) Int. Cl.
G06F 7/00 (2006.01)

(52) U.S. Cl. .......................................... 707/6; 705/29

(58) Field of Classification Search ................ 707/7, 707/6; 705/27–29
See application file for complete search history.

(56) References Cited

U.S. PATENT DOCUMENTS

| | | | | |
|---|---|---|---|---|
| 5,159,667 A | * | 10/1992 | Borrey et al. ............... | 715/500 |
| 5,878,416 A | * | 3/1999 | Harris et al. ................. | 707/10 |
| 6,094,654 A | * | 7/2000 | Van Huben et al. ........... | 707/8 |
| 6,321,224 B1 | * | 11/2001 | Beall et al. .................... | 707/5 |
| 6,687,557 B1 | * | 2/2004 | Ouchi .......................... | 700/95 |
| 2002/0087440 A1 | * | 7/2002 | Blair et al. .................... | 705/29 |
| 2003/0041059 A1 | * | 2/2003 | Lepien .......................... | 707/5 |
| 2003/0115115 A1 | * | 6/2003 | Ouchi .......................... | 705/27 |
| 2003/0150909 A1 | * | 8/2003 | Markham et al. ........... | 235/376 |
| 2003/0182321 A1 | * | 9/2003 | Ouchi .......................... | 707/201 |
| 2003/0220852 A1 | * | 11/2003 | Back et al. .................... | 705/29 |

OTHER PUBLICATIONS

Jason Spera, Managing Front-End Data More Efficiently, Feb. 2000, Aegis Industry, Feb. 2000, 3 pages.*
Marks, CheckPoint B.O.M. Manager Manual, Apr. 18, 2001, Aegis Industrial Software, 66 pages.*

* cited by examiner

Primary Examiner—Don Wong
Assistant Examiner—Michael Le
(74) Attorney, Agent, or Firm—James E. Walton

(57) ABSTRACT

A method for part data matching includes receiving a selection of an input file from a user. The input file includes part information identifying one or more parts. The part information includes at least one manufacturer name and at least one part number. A selection of a manufacturer name match template and a manufacturer part number match template are also received from the user. The match templates identify one or more matching techniques and the order in which the matching techniques are to be applied to match part information in the input file with part information in one or more sources of parts data. The matching techniques are used to identify one or more potential part matches, which are communicated to the user. In addition, the method includes receiving a selection of a potential match from the user for one or more parts identified in the input file.

38 Claims, 4 Drawing Sheets

| PARENT ITEM NUMBER | CHILD ITEM NUMBER | QUANTITY | LINE NUMBER |
|---|---|---|---|
| 01-000001-01 | 01-000039-00 | 10 | 1 |
| 01-000039-00 | 01-000048-00 | 10 | 1 |
| 01-000048-00 | | 10 | 1 |

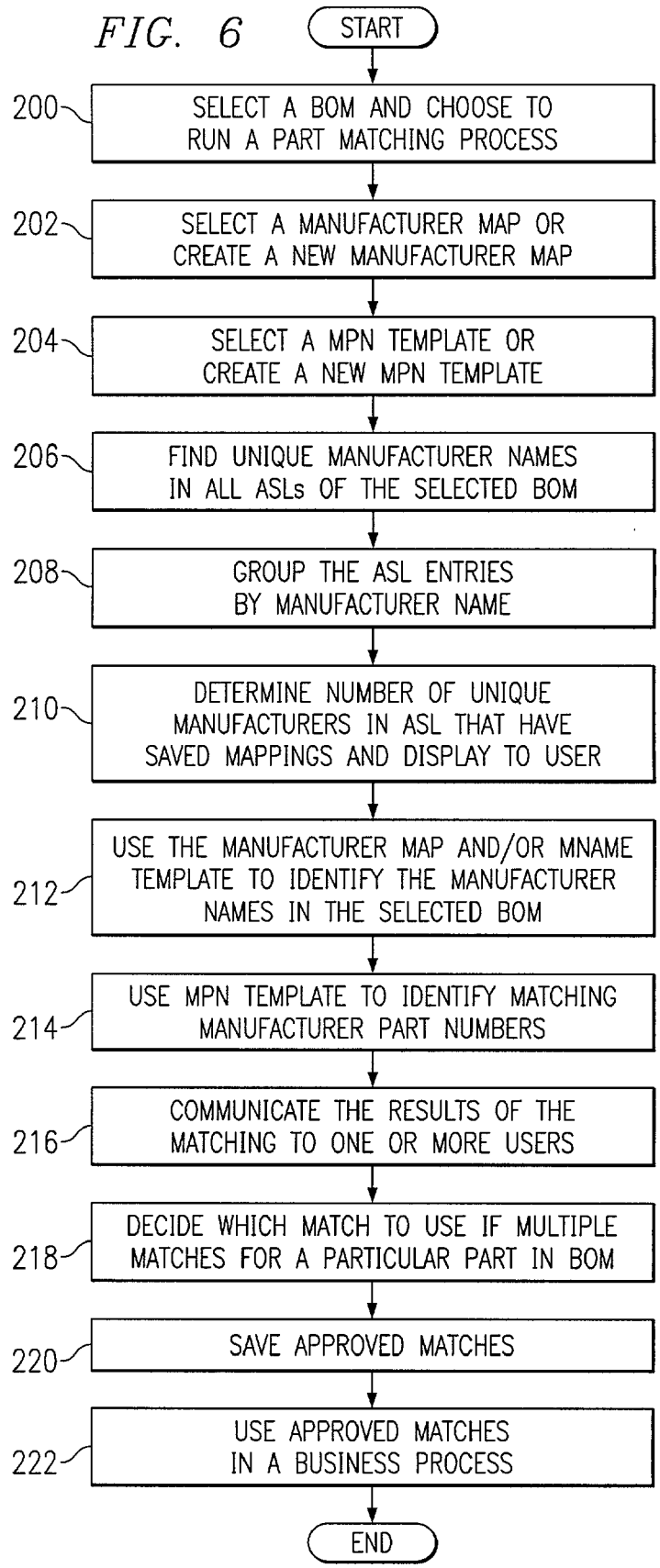

MATCHING AND CLEANSING OF PART DATA

RELATED APPLICATIONS

This application claims the benefit of U.S. Provisional Application Ser. No. 60/298,635 filed Jun. 15, 2001.

TECHNICAL FIELD OF THE INVENTION

This invention relates to the field of business data management, and more particularly to matching and cleansing of part data.

BACKGROUND OF THE INVENTION

A bill of materials (BOM) is a complete list of the parts or other items which make up a particular product to be manufactured or which otherwise need to be supplied to an entity. A BOM typically identifies a number of parts and each part may have an associated part number, a requested quantity, and possibly other information used to describe each part. As referred to herein, the term "BOM" may refer to a single file that includes this information or may refer to multiple types of files that collectively include this information, such as a BOM and an approved supplier list (ASL). The BOM may be organized by sub-assemblies, such that BOM includes descriptions of each sub-assembly, the parts that are included in each sub-assembly, and how the sub-assemblies relate to the finished product. Therefore, a BOM is often an essential part of a logistics management process associated with developing and manufacturing a product. An ASL may have information on approved suppliers for each item in a BOM. For example, each item in a BOM may have multiple associated records that each identify a part from a particular manufacturer that corresponds to the item in the BOM.

Inaccurate information in the BOM, such as an incorrect or unknown part number, can create a number of problems for the entity generating the BOM (to have a product manufactured or to obtain parts to be used in the manufacture of a product) and for the entity that responds to the BOM and manufactures the product according to the BOM or provides parts listed in the BOM. These problems include, but are not limited to, incorrect costing and pricing of a product, inaccurate part inventory levels, accounting variances, production of defective or out-of-spec products, and losses associated with customer dissatisfaction and potential product liability claims associated with defective or out-of-spec products.

SUMMARY OF THE INVENTION

According to the present invention, disadvantages and problems associated with previous techniques for matching and cleansing part information in bills of materials (BOMs) have been substantially reduced or eliminated.

According to one embodiment of the present invention, a method for part data matching includes receiving a selection of an input file from a user. The input file is received from an input file originator and includes part information identifying one or more parts. The part information includes at least one manufacturer name and at least one part number. The method also includes receiving a selection of a manufacturer name match template and a manufacturer part number match template from the user. The match templates identify one or more matching techniques and the order in which the matching techniques are to be applied to match part information in the input file with part information in one or more sources of parts data. The method further includes using the matching techniques to identify one or more potential part matches, and communicating the potential matches to the user. In addition, the method includes receiving a selection of a potential match from the user for one or more parts identified in the input file.

Particular embodiments of the present invention provide one or more technical advantages. For example, certain embodiments provide a faster and more efficient technique for matching part information in an input BOM file to one or more known sources of parts data. Furthermore, certain embodiments provide advanced matching techniques, such as those using fuzzy logic, to provide more accurate matching of incoming part information. In addition, particular embodiments provide for the use of match templates and manufacturer maps that make the matching process more flexible. These match templates allow a user to specify unique sets of matching parameters and to apply these unique sets as needed. Moreover, particular embodiments may save part matches to a history database to allow the system to "learn" and to make the matching process more efficient. Different sets of parameters may be applied to BOMs from different BOM originators or different sets of parameters may be applied to different types of parts data. Match templates may also be used in combination to make the matching process more efficient. Once potential matches have been found, certain embodiments also provide for collaboration between multiple users and/or between users and the BOM originator to resolve matching issues.

Other technical advantages will be readily apparent to those skilled in the art from the figures, description and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 6 illustrates an example method for BOM matching and cleansing using a manufacturer map and match templates.

DESCRIPTION OF EXAMPLE EMBODIMENTS

Figures 1, 2:
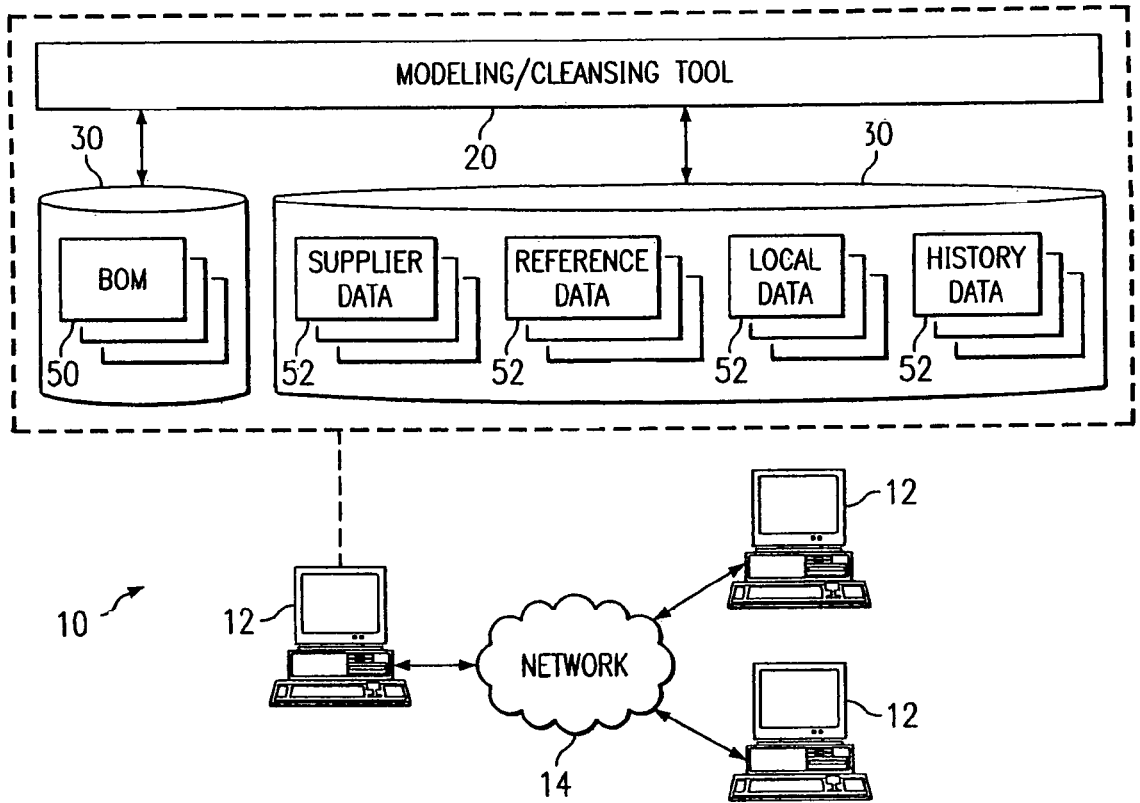
FIG. 1 illustrates an example bill of materials (BOM) matching and cleansing system.
FIG. 2 illustrates an example approved supplier list (ASL)

FIG. 1 illustrates an example bill of materials (BOM) matching and cleansing system 10. The term "BOM" is meant to include any list or other compilation of part information (including, but not limited to part numbers, part names, part descriptions, and manufacturer names) and should not be limited to any particular formats of such information. Furthermore, as described above, the term "BOM" may refer to a single file that includes this information or may refer to multiple types of files that collectively include this information, such as a BOM and an approved supplier list (ASL). In addition, the term "part" is meant to include any components, elements, materials, articles or any other appropriate items.

System 10 includes a data matching/cleansing tool 20 and one or more data storage locations 30 that may be used to store data generated by or otherwise used by a component of system 10. System 10 may be used to improve a material quotation process or any other business processes in which parts or other items listed in a BOM or other file need to be identified for a particular purpose. In the material quotation process, a material (part) receives one or more BOMs from a customer (such as an OEM) for the customer's final products or subassemblies. The provider typically cross references the parts in the customer's BOM with the parts information stored in the provider's database(s) and generates a quote. However, the part information received from the customer may not match exactly with the part information stored in the provider's databases because of different identifying information used to identify the part, alternate spellings, abbreviations, typographical errors, or any other differences between the part information supplied by the customer and the part information in the provider's databases. Therefore, using exact string matching techniques to find the parts may not find all the items. More robust and flexible part matching techniques are needed to cross reference the BOM information. System 10 provides such techniques.

The components of system 10 may be implemented as software and/or hardware associated with one or more computers 12 in one or more locations. Furthermore, multiple computers 12 each having a system 10 (or portions thereof) may be coupled using a network 14. Network 14 may include any appropriate combination of public and/or private networks coupling computers 12. In an example embodiment, network 14 includes the Internet and any appropriate local area networks (LANs), metropolitan area networks (MANs), or wide area networks (WANs) coupling computers 12 to the Internet. In an example embodiment, computers 12 may be associated with an original equipment manufacturer (OEM) (or any other entity desiring to create a product to sell) and one or more suppliers of the OEM. In such a case, the OEM may generate a BOM 50 and communicate BOM 50 to system 10 using network 14. System 10 receives BOM 50 and may store BOM 50 in a data storage location 30. In this situation, the BOM 50 may identify a number of parts that are included in a particular product and the OEM may communicate BOM 50 to one or more suppliers that are to provide the parts and/or manufacture the product or portions of the product (and BOM 50 may be included as part of a request for quote (RFQ) associated with the product).

Although an OEM and associated suppliers are described in the example above, system 10 may be used to match and cleanse BOMs 50 in association with any suitable types of transactions between any appropriate entities in a business environment, such as a supply chain or value chain. For example, system 10 may be used internally by an entity to analyze a BOM 50 before it is sent to a manufacturing or procurement facility of the entity. For instance, system 10, and more specifically, matching tool 20 may be used to cross-reference internal part numbers and names of parts to standardized part numbers and names, determine alternative parts to the parts in the BOM 50 (for example, less expensive or more optimal parts), to compare the manufacturer of each part in the BOM 50 with an approved manufacturer list, to provide a life cycle analysis, or any other appropriate functions.

Furthermore, matching tool 20 may be associated with an electronic marketplace or other location that is available to numerous entities and matching tool 20 may be used as needed by these entities. For example, a matching tool 20 may be provided through an electronic marketplace shared by entities included in a supply chain, and the entities may communicate BOMs 50 to one another through the electronic marketplace such that the BOMs 50 may be analyzed using matching tool 20 before being communicated to one or more entities in the supply chain. In addition, matching tool 20 may be used in any other appropriate circumstances. In order to generalize the use of system 10, an entity which generates a BOM 50 and/or an entity which otherwise communicates a BOM 50 will be referred to as a "BOM originator" and an entity which receives a BOM 50 and uses matching tool 20 to analyze the BOM 50 will be referred to as a "BOM recipient". It should be noted that when an entity uses matching tool 20 internally, that entity may be both the BOM originator and BOM recipient (although different divisions of the entity may have these assigned roles).

In operation, matching tool 20 provides the ability to import a BOM 50 in any appropriate format and match the part identifying information in BOM 50 against one or more sources of parts data 52, which may be stored in one or more data storage locations 30. This matching may include exact matching and other techniques used to identify part matches when there is not an exact match with data included in parts data 52. Parts data 52 may include any appropriate part information sources. For example, parts data 52 may include a database of generally accepted or standard part information (which may be referred to as reference database), a database of part information used by one or more suppliers of parts (which may be referred to as supplier databases), a database of part information used by the BOM recipient (which may be referred to as a local database), history tables (which include approved mappings of part information from previously received BOMs 50 to parts data 52), and/or any other appropriate sources of part information.

Any appropriate types and formats of BOMs 50 may be analyzed by system 10. In an example embodiment, a BOM 50 includes both an approved supplier list (ASL) (which may also be an approved manufacturer list or an approved vendor list) and a BOM file. These example files are illustrated in FIGS. 2 and 3.

FIG. 2 illustrates an example ASL 60. For each part, ASL 60 includes such part information as an item number 62, a part description 64, a manufacturer part number (MPN) 66, and a manufacturer name 68. Some or all of this information may be compared with information in parts data 52 to find a match. ASL 60 also contains information on the approved suppliers for each part. For example, for particular item number "01-000001-01," there are two approved suppliers, AVX and Dale. The BOM recipient may use this information when providing a quote to the BOM originator with respect to a BOM 50 of which ASL 60 is a part.

Figures 3, 4:
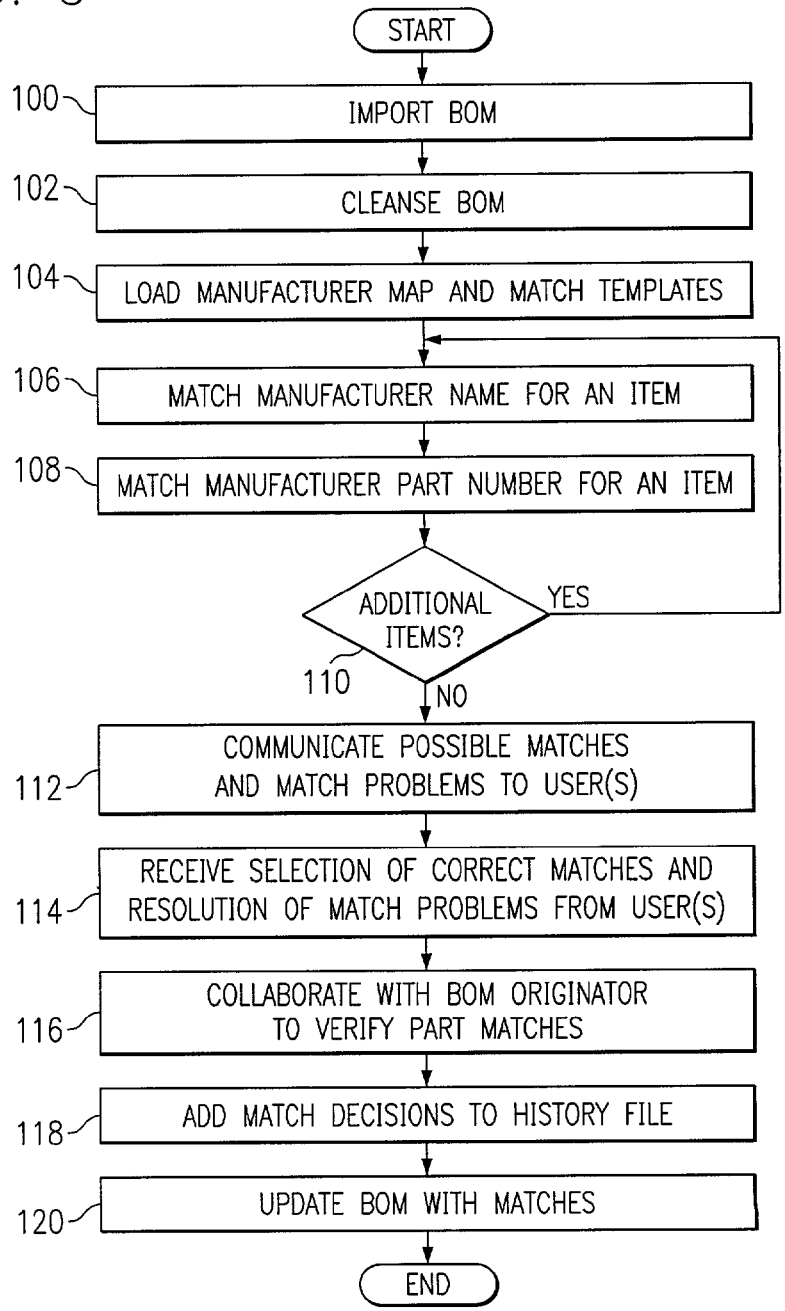
FIG. 3 illustrates an example BOM file used in conjunction with the ASL of FIG. 2.
FIG. 4 illustrates an example method for BOM matching and cleansing.

FIG. 3 illustrates an example BOM file 70. Together, ASL 60 and BOM file 70 form a BOM 50. As illustrated, BOM file 70 includes such information as a parent item number 72, a child item number 74, and a quantity 76. This information provides assembly information, allows different parts to be related hierarchically, and identifies the quantity of a particular item in a product or portion of a product defined by the BOM 50. As can be seen, the information in BOM file 70 may not be used in the matching process. In such a case, matching tool 20 may only use ASL 60. However, the information in BOM file 70 may provide information relevant to the matching process and it provides information needed by the BOM recipient to provide a quote for the BOM 50 to the BOM originator or to perform other tasks with respect to the BOM 50. The collective information included in ASL 60 and BOM file 70 may be included in a single file or in multiple files. Furthermore, additional information may be provided and/or some if the illustrated information may not be included. In an example embodiment, the ASL 60 and BOM file 70 may be in a neutral file format (such as a text file) or XML format. Furthermore, although BOM 50 may include a hierarchical BOM 70, BOM 50 may also include a "flat" parts list.

Returning to FIG. 1, in order to match part information in a BOM 50 with parts data 52, matching tool 20 uses one or more matching techniques (either alone or in combination) to match particular portions of the part information in a BOM 50 with the part information in one or more sources of parts data 52. For example, matching tool 20 may attempt to match a manufacturer name and a manufacturer part number associated with a part in a BOM 50 with a corresponding manufacturer name and part number in parts data 52. As described above, the manufacturer name or the part number in the input file may not match exactly with parts data 52 because of alternate spellings, abbreviations, typographical errors, or other differences. For instance, a manufacturer called "Widget Corporation" in parts data 52 may be represented in the input BOM 50 as: "Widget Corp," "Widget," "Widgit Corporation," or any other variations or corruptions of Widget Corporation. Thus, in order to match a part represented in a BOM 50, system 10 is able to match many possible representations and corruptions of "Widget Corporation."

One type of matching technique that matching tool 20 may use is exact matching. An exact match is when two strings (an input BOM file string and a parts data 52 string) are the same. If such a match is found, no other matching techniques need to be applied. One or more non-exact matching techniques may also be used to find approximate string matches. Some example matching techniques are described below; however, any appropriate matching techniques may be used and matching tool 20 may be configured to allow updating of matching tool 20 to perform additional matching techniques.

One type of matching technique that may be used is a special character handling technique. Using this technique, a user-defined set of special characters are removed or cleansed from the input string before matching the string. These removed characters may include any appropriate characters, but examples include spaces, commas, hyphens, and periods. In the case of part number matching, the stripped input string may be matched against any type of parts data 52, but it may be helpful in particular circumstances to include stripped part number data in parts data 52.

Another type of matching technique that may be used is a sliding match technique. This technique searches for an input string contained anywhere in a string in parts data 52. Such a search can be implemented using wild cards. For example, to find a sliding match for the string "str," a sliding match technique may search for "*str*." A special case of a sliding match technique is a starts-with matching technique. This is a match in which the shorter string matches the longer string only up to the length of the shorter text string. A user-defined parameter will determine the number of characters from the original string to use for the search. For example, if the input manufacturer name is "Widget" and a user sets the parameter to three characters, a search may be performed for "Wid*."

A fuzzy matching technique may also be used. One fuzzy match is one in which two text strings have similar spellings are matched. This type of matching is helpful for finding results when there are misspellings in a BOM 50 and/or parts data 52. For instance, with fuzzy matching, a manufacturer called "Widget Corp." will be found even if it is spelled as "Widgit Corp." in a BOM 50 or in parts data 52. In particular embodiments, fuzzy matching may be implemented using a relational database's fuzzy search capabilities.

Yet another technique that may be used is a "sounds-like" matching technique. Such a technique attempts to match words that have similar sounds. This function allows comparison of words that are spelled differently, but sound alike in English (or any other appropriate language). In particular embodiments, sounds-like matching may be implemented using a relational database's "soundex" search option.

A generic or series matching technique may also be used. An identifying designation or type number for a part may be stored in a generic number field in parts data 52. Some entities may provide these generic numbers in a BOM 50 instead of the detailed part numbers. Using this technique, the input part numbers will be matched against the generic number field to find possible matches.

Although particular types of matching techniques are described above, it should be understood that any other appropriate techniques may be used in matching tool 20 within the scope of the present invention. Furthermore, any suitable number of matching techniques can be used in a particular matching process and may be used serially in any specified order or may be used in parallel. Furthermore, matching techniques can be used to specifically match a particular type of part information. For example, different sets of matching techniques may be used to match manufacturer names and part number.

FIG. 4 illustrates an example method for BOM matching and cleansing using system 10. The method begins at step 100 where a BOM 50 that has been received from a BOM originator is imported into matching tool 20. At step 102, BOM 50 may be cleansed by removing unwanted characters using a special character handling technique. It should be noted that although described separately, this step may be performed in association with the matching performed at steps 106 and 108. At step 104, a manufacturer map, a manufacturer name (MNAME) match template, and a manufacturer part number (MPN) match template are selected by a user and loaded by matching tool 20. Matching tool 20 may match parts in a BOM 50 using may different techniques, but in particular embodiments, such a manufacturer map and match templates are used to customize the matching process and make the selection of matching techniques and other matching parameters more flexible and efficient. The use of such a manufacturer map and match templates is described in further detail below; however, for purposes of the description of this example method it should be understood that the manufacturer map and match templates allow a user to specify how the matching process is to be performed by matching tool 20 (for example, which matching techniques should be used and in what order).

The example method continues at step 106 where matching tool 20 matches a manufacturer name for a particular item in the imported BOM 50 to one or more manufacturer names associated with part information in parts data 52 (the matching techniques used and sources of parts data 52 searched are indicated in the MNAME match template). As described above, numerous different matching techniques may used to match manufacturer name data in BOM 50 with manufacturer name data in one or more sources of parts data 52. These searching techniques may be used serially or in parallel. For example, for a given part in BOM 50, easier and less time-consuming techniques may be tried before using more advanced techniques. If a simpler technique identifies a match, further matching may not be performed for that particular part. Once the manufacturer name has been matched for the particular item, matching tool 20 searches at step 108 in the subset of parts in parts data 52 having the matching manufacturer name information for parts also having matching manufacturer part numbers (the matching techniques used and sources of parts data 52 searched are indicated in the MPN match template). Therefore, a first search is performed for parts in parts data 52 that are made by a particular manufacturer, and then these parts are searched for parts also having a matching part number. Such as two-stage search increases the efficiency of the matching process. However, it should be understood that such a two-stage process need not be used. Furthermore, other parameters besides or in addition to the manufacturer name and manufacturer part number may be used to identify matching parts. Step 106 and 108 may be performed for each part in a BOM 50. At step 110, matching tools 20 determines whether additional parts for which a match has not been attempted remain in BOM 50. If so, the method returns to step 106 for those additional parts. However, it should be noted that matching may be performed for multiple parts at once. If no additional parts for which a match has not been attempted remain, the method proceeds to step 112.

At step 112, matching tool 20 communicates the matches found to one or more users and may also communicate problems in the matching process (for example, when no matches were found for the manufacturer name and/or the manufacturer part number). In particular embodiments, if desired, matches are not communicated to the user if there was only a single potential match or if there was an exact match. If more than one potential matches were found for a part included in BOM 50, the potential matches may be ranked in order of closeness of the match or in any other appropriate order. Modeling tool 20 may communicate this match result information to the one or more users in one or more user interfaces that allows the users to choose the desired match from multiple potential matches and that enables the users to otherwise respond to matching problems. When multiple users are involved, these users may collaborate to resolve the matching issues. For example, particular users may be responsible for resolving different types of matching issues, matching issues relating to a certain type of parts, matching issues relating to a BOM 50 from a particular BOM originator(s), or any other suitable divisions of responsibilities. Multiple users may also recommend particular potential matches and/or resolutions of other matching issues, and a particular user may then view all these recommendations and determine the appropriate matches and resolutions.

At step 114, matching tool 20 receives the selection of correct matches (from a list of multiple potential matches) and other input to resolve match issues from the one or more users. Matching tool 20 may allow the BOM originator to verify one or more of the part matches at step 116. For example, matching tool 20 may communicate one or more such matches to the BOM originator and wait for confirmation of the accuracy of the match. This collaboration with the BOM originator may only occur with respect to unresolved matching issues in particular embodiments. The matches or unresolved issues to be communicated to the BOM originator may be selected by a user or automatically determined by matching tool 20. Once matches have been identified (and potentially verified by the BOM originator), matching tool may add a mapping of the input part information in the BOM 50 to the matched part information in parts data 52 to a history database 52 at step 118. By creating such a history database 52, matches may be made in the future using the history database 52 when the same part information is sent in a subsequent BOM 50 from the same BOM originator. At step 120, the imported BOM 50 is updated (or a new version is created) to reflect the matching that was performed, and the method ends. Furthermore, one or more appropriate workflows may be invoked based on the part matching process. For example, if a new part match was found from non-local data, a workflow may be initiated to include the new part in local database 52. As another example, a workflow may be initiated that directs particular part matches to particular users for further processing (such as sourcing of the part or enriching of part information) based on the type of part or other suitable characteristics.

As briefly described above, a user may create and use a manufacturer map and match templates to improve and customize the matching process. A manufacturer map is a mapping of input manufacturer names (names received in BOMs 50) to manufacturer names in parts data 52. Because many parts in BOMs 50 may have the same associated manufacturer name, searching for the same string (the manufacturer name) multiple times using complex matching techniques is typically inefficient. Therefore, a manufacturer map may be created to map one or more input manufacturer name strings received from a BOM originator in a BOM 50 to one or more manufacturer names in parts data 52, and this mapping may be used in the manufacturer name matching process before matching techniques are attempted.

A manufacturer map may be created for a particular manufacturer by specifying an input manufacturer name and specifying one or more matching techniques that should be applied to the input name to create mappings to names in parts data 52 (and the order in which the techniques are applied). These choices may be stored by system 10 in a reusable match template, which is described in further detail below. In particular embodiments, one manufacturer map will be created per BOM originator and all users may use this map for that BOM originator. However, there may be more than one manufacturer map per BOM originator.

Figure 5:
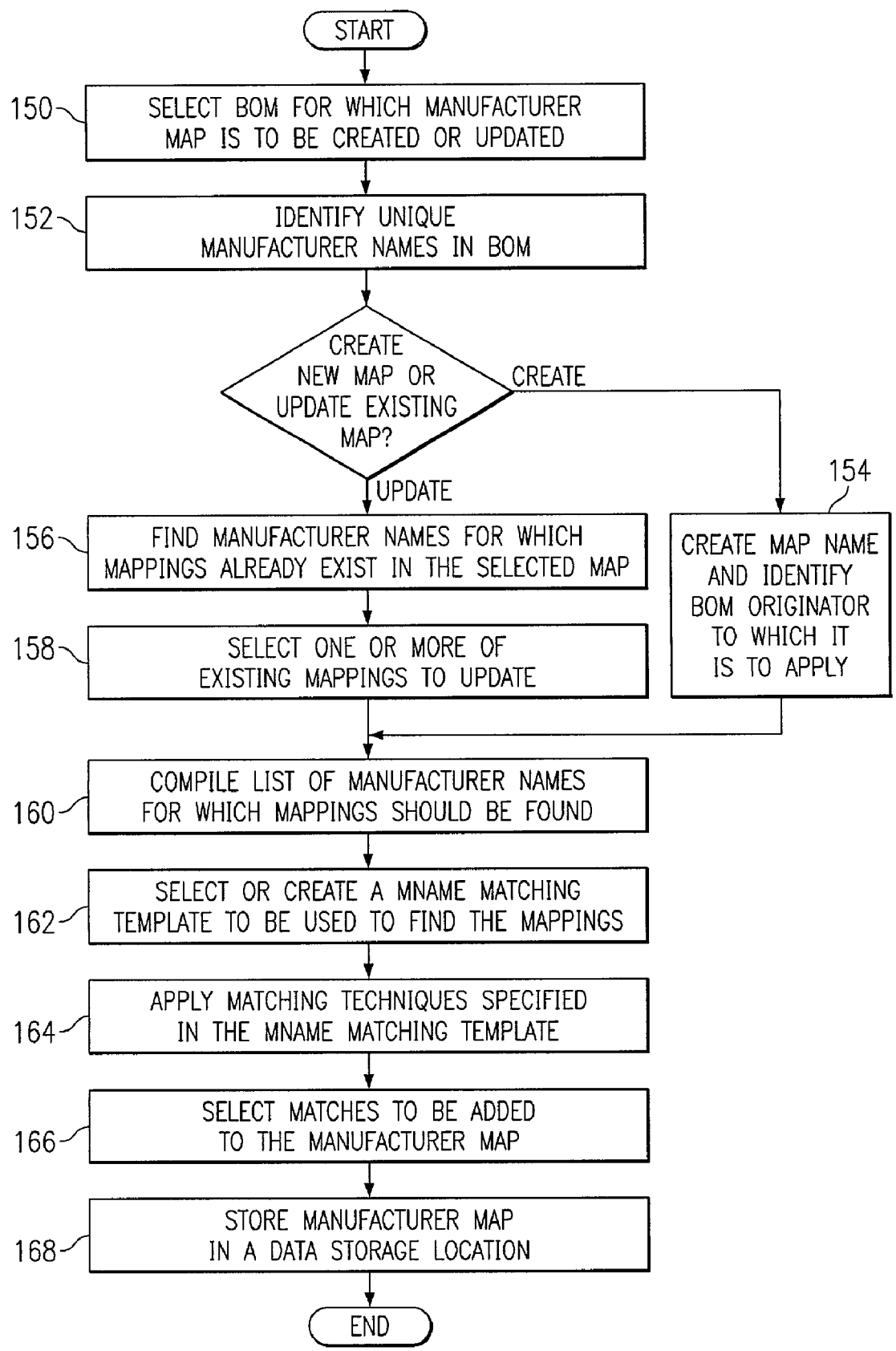
FIG. 5 illustrates an example method for creating a manufacturer map.

FIG. 5 illustrates an example method of creating a manufacturer map. The method begins at step 150 where a user selects a BOM 50 and chooses to build or update a manufacturer map with respect to that BOM 50. At step 152, matching tool 20 identifies all the unique manufacturer names in all ASLs of that BOM 50 (or in any other appropriate parts of BOM 50). If the user has chosen to create a new manufacturer map, the user enters the following values at step 154: a manufacturer map name and the BOM originator to which the map applies. If the user has chosen to update an existing manufacturer map, at step 156 modeling tool 20 finds manufacturer names in the list of unique manufacturer names found at step 152 for which mappings already exist in the selected existing map. At step 158, the user selects one or more of these mappings to update.

At step 160, a list of manufacturer names for which mappings should be found is compiled (those that do not have any existing map and those selected to be updated at step 158). At step 162, the user selects or creates a MNAME match template (described in further detail below) to be used to find the mappings. For each manufacturer name in the list compiled at step 160, matching tool 20 applies the matching techniques specified in the MNAME match template at step 164. At step 166, matching tool 20 communicates the matches found for each manufacturer name to the user and the user selects the matches to be added to the manufacturer map as manufacturer name mappings. The manufacturer map is then stored in a data storage location 30 at step 168, and the method ends. It should be noted that steps 164 and 166 may be performed for each matching technique before going on to the next matching technique. After the user has selected matches from one matching technique, matching tool 20 will run the next matching technique and append the matches found with that technique to this list. Alternatively, matching tool 20 may run all the matching techniques before presenting the matches for the user to select.

As described above, a match template allows a user to store and reuse a selection of which matching algorithms are to be applied, the order in which they are applied, and any other appropriate parameters relating to the matching process. Matching tool 20 may communicate one or more user interfaces to a user to enable the user to select and specify these parameters. As mentioned above, there are two types of match templates, one for manufacturer name matching (MNAME match template) and the other for manufacturer part number matching (MPN match template).

An MNAME Template is used to search for manufacturer names while building a manufacturer map. The parameters that may be specified in this template include which manufacturer name matching techniques are applied and the order in which the selected matching techniques are applied. Furthermore, a user may also specify any special characters that need to be removed from the manufacturer names in a BOM 50 before doing the search and may specify the maximum number of items returned per matching technique. Search exit criteria may also be specified. For example, a user may specify that matching tool 20 should exit after each matching technique is applied, display the intermediate results to the user, and then continue with the next technique if the user so chooses. Alternatively, the user may specify that matching tool 20 should apply all matching techniques and display the results to the user at the end.

An MPN Template is used during the part number matching process. For example, a MNAME template may first be used to build a manufacturer map, and then the resulting manufacturer map and an MPN template may be used to find the part number matches. The parameters that may be specified in this template include which manufacturer part number matching techniques are applied and the order in which the selected matching techniques are applied. Furthermore, a user may also specify any special characters that need to be removed from manufacturer part numbers in a BOM 50 before doing the search and may specify the maximum number of items returned per matching technique. Search exit criteria may also be specified, as described above. A user may also specify a part number-only search that instructs matching tool 20 to search only on the manufacturer part number without using the manufacturer name. This may be useful to find generic parts, which usually tend to have the same part number, but can be supplied or manufactured by a variety of manufacturers.

The use of match templates provides system 10 with more flexibility than previous systems. These match templates allow a user to specify unique sets of matching parameters and to apply these unique sets as needed. Different sets of parameters may be applied to BOMs 50 from different BOM originators or different sets of parameters may be applied to different types of data. Match templates may also be used in combination to make the matching process more efficient. As an example only, a "quick" match template (for example, one specifying simple matching techniques) may be tried first. If sufficient matches are not found, a more complex template may be used. Such a use may also be accomplished through an ordering of match techniques within a single template. Match templates may also be used in numerous other ways to improve the matching process.

FIG. 6 illustrates an example method for BOM matching and cleansing using a manufacturer map and match templates. The example method illustrated in FIG. 6 provides example details of particular steps found in the method illustrated in FIG. 4. The method begins at step 200 where the user selects a BOM 50 that has been received by system 10 and chooses to run a part matching process for BOM 50. At step 202, the user either selects a manufacturer map or creates a new manufacturer map. If the user creates a new manufacturer map, this creation of a new manufacturer map involves, in part, either selecting an existing MNAME template or creating a new MNAME template to be used to create the manufacturer map. If a new MNAME template is created, the method also includes choosing one or more matching techniques to apply and the order in which they are applied (among other parameters). At step 204, the user either selects an existing MPN template or creates a new MPN template. If a new MPN template is created, the method includes choosing one or more matching techniques to apply and the order in which they are applied (among other parameters).

At step 206, matching tool 20 finds all unique manufacturer names in the ASLs of the selected BOM 50 (or other locations associated with BOM 50) and groups the ASL entries by manufacturer name at step 208. At step 210, matching tool 20 determines a "hit rate," which is the number of manufacturers in the list of unique manufacturer names that already have saved mappings, and displays this hit rate to the user. After seeing the hit rate and the mapped manufacturer names, the user may choose to continue with the matching process or the user can select a new manufacturer map.

At step 212, matching tool 20 uses the manufacturer map (including the matching techniques specified in the MNAME template for unsaved manufacturer name mappings) to identify the manufacturer names in the selected BOM 50. Once the manufacturer name has been matched for a particular item in BOM 50, matching tool 20 searches at step 214 in the subset of parts in parts data 52 for which a manufacturer name match was found for parts also having a matching manufacturer part number (the matching techniques used and sources of parts data 52 searched are indicated in the MPN match template). At step 216, matching tool communicates the results of the matching to one or more users. If the match template specifies that matching tool 20 is to exit after every matching technique, the results of each matching technique are communicated to the user when the matching technique is completed. The user may then instruct matching tool 20 to proceed with the next matching technique. Alternatively, all of the results may be communicated to the user after all matching techniques have been performed (a "batch" mode). In particular embodiments, if the user chooses to exit after all algorithms are run, the part matching process may continue to decrease the number of parts it searches for if previous matching techniques have found potential matches. Therefore, if matches are found for some parts using one matching technique, these parts are not searched for using the subsequent matching techniques. The user may also choose to run the entire part matching process in the background. For example, the user can request that system 10 launch the part matching process in a separate thread. System 10 will then run all the matching techniques selected in the template, save the results, and send an alert to the user.

Once the matches are found using the part matching process, the user (or multiple users and/or the BOM originator) decides at step 218 which match to use if multiple potential matches are found for a particular part. In some situations, the user may not decide immediately, but may collaborate with the others users and/or the BOM originator over a period of time. Hence, the system may allow the user to store all the potential matches found in a staging table so that they are available in the future without having to run the part matching process again. Once the appropriate matches are selected and approved (by a single user, multiple users, and/or the BOM originator), the approved matches are saved at step 220. The approved matches are used in a business process at step 222, such as to generate quotes in a quote management process, and the method ends.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented system for part data matching, the system comprising one or more memory units and one or more processing units collectively operable to:

receive a selection of an input file from a user of the system, the input file being received by the system from an input file originator and comprising part information identifying one or more parts, the part information comprising at least one manufacturer name and at least one part number;

receive a selection of a manufacturer name match template from the user, the manufacturer name match template being stored in association with the system, wherein the manufacturer name match template is configurable by the user to identify one or more matching techniques and to specify the order in which the identified matching techniques are to be applied, the order being specified without deleting any of the identified matching techniques, to match a manufacturer name associated with one or more parts in the input file with a manufacturer name associated with one or more parts identified in one or more sources of parts data that are stored in association with the system;

receive a selection of a manufacturer part number match template from the user, the manufacturer part number match template being stored in association with the system, wherein the manufacturer part number match template is configurable by the user to identify one or more matching techniques and to specify the order in which the identified matching techniques are to be applied, the order being specified without deleting any of the identified matching techniques, to match a manufacturer part number associated with one or more parts in the input file with a manufacturer part number associated with one or more parts identified in the one or more sources of parts data;

use the matching techniques identified in the manufacturer name match template to identify one or more potential matches between a manufacturer name associated with one or more parts in the input file and a manufacturer name associated with one or more parts identified in the one or more sources of parts data;

use the matching techniques identified in the manufacturer part number match template to identify one or more potential matches between a manufacturer part number associated with one or more parts in the input file and a manufacturer part number associated with one or more parts identified in the one or more sources of parts data for which a potential manufacturer name match was found;

communicate the potential matches to the user; and receive a selection of a potential match from the user for one or more parts identified in the input file, the selection of the potential match for a particular part indicating that manufacturer name and manufacturer part number in the input file that are associated with the part are to be used to identify the part.

2. The system of claim 1, wherein the input file comprises a bill of materials.

3. The system of claim 1, wherein the input file comprises a parts list.

4. The system of claim 1, wherein the input file comprises a bill of materials, and wherein the bill of materials comprises an approved supplier list.

5. The system of claim 1, wherein the one or more sources of parts data that are stored in association with the system are selected from the group consisting of a reference database, a supplier database, a local database, and a history database.

6. The system of claim 1, wherein the match templates may be reused for multiple input files.

7. The system of claim 1, wherein the manufacturer part number match template and the manufacturer name match template are further configurable by the user to identify special characters that need to be removed from part information in the input file before using the matching techniques associated with the particular match template.

8. The system of claim 1, wherein the manufacturer part number match template and the manufacturer name match template are further configurable by the user to identify a maximum number of potential matches per matching technique to be communicated to the user.

9. The system of claim 1, wherein the matching techniques comprise techniques using fuzzy logic.

10. The system of claim 1, wherein the components of the system are further operable to:

receive a selection of a manufacturer map, the manufacturer map including one or more mappings of one or more input manufacturer names to manufacturer names in the one or more sources of parts data, the manufacturer map including the manufacturer name match template and using the matching techniques specified in the manufacturer name match template to create the mappings; and use the manufacturer map to identify one or more potential matches between a manufacturer name associated with one or more parts in the input file and a manufacturer name associated with one or more parts identified in the one or more sources of parts data.

11. The system of claim 10, wherein the manufacturer map may be reused for multiple input files.

12. The system of claim 1, wherein the potential matches are communicated to the user after each matching technique specified in a match template is attempted.

13. The system of claim 1, wherein the potential matches are communicated to the user after all matching techniques specified in a match template have been attempted.

14. The system of claim 1, wherein the components of the system are further operable to not attempt to identify potential matches for a part in the input file with a particular matching technique if a part in the one or more sources of parts data having a matching manufacturer name and manufacturer part number is identified using a previous matching technique.

15. The system of claim 1, wherein the components of the system are further operable to receive a selection of potential matches for an input file from a plurality of users.

16. The system of claim 1, wherein the components of the system are further operable to save the selected potential matches in a revised input file.

17. The system of claim 1, wherein the components of the system are further operable to use the revised input file in a material quotation process.

18. The system of claim 1, wherein the components of the system are further operable to:
store the selected potential matches in a history database; and
use the history database as a source of parts data.

19. The system of claim 1, wherein the components of the system are further operable to store one or more of the potential matches in a staging table for future access by the user.

20. A computer-implemented method for part data matching, the method being performed using a computer system comprising one or more memory units and one or more processing units, the method comprising:
using the computer system, receiving a selection of an input file from a user, the input file being received from an input file originator and comprising part information identifying one or more parts, the part information comprising at least one manufacturer name and at least one part number;
using the computer system, receiving a selection of a manufacturer name match template from the user, the manufacturer name match template being configurable by the user to identify one or more matching techniques and to specify the order in which the identified matching techniques are to be applied, the order being specified without deleting any of the identified matching techniques, to match a manufacturer name associated with one or more parts in the input file with a manufacturer name associated with one or more parts identified in one or more sources of parts data;
using the computer system, receiving a selection of a manufacturer part number match template from the user, the manufacturer part number match template being configurable by the user to identify one or more matching techniques and to specify the order in which the identified matching techniques are to be applied, the order being specified without deleting any of the identified matching techniques, to match a manufacturer part number associated with one or more parts in the input file with a manufacturer part number associated with one or more parts identified in the one or more sources of parts data;
using the computer system, using the matching techniques identified in the manufacturer name match template to identify one or more potential matches between a manufacturer name associated with one or more parts in the input file and a manufacturer name associated with one or more parts identified in the one or more sources of parts data;
using the computer system, using the matching techniques identified in the manufacturer part number match template to identify one or more potential matches between a manufacturer part number associated with one or more parts in the input file and a manufacturer part number associated with one or more parts identified in the one or more sources of parts data for which a potential manufacturer name match was found;
using the computer system, communicating the potential matches the user; and
using the computer system, receiving a selection of a potential match from the user for one or more parts identified in the input file, the selection of the potential match for a particular part indicating that manufacturer name and manufacturer part number in the input file that are associated with the part are to be used to identify the part.

21. The method of claim 20, wherein the input file comprises a bill of materials.

22. The method of claim 20, wherein the input file comprises a parts list.

23. The method of claim 20, wherein the input file comprises a bill of materials, and wherein the bill of materials comprises an approved supplier list.

24. The method of claim 20, wherein the one or more sources of parts data are selected from the group consisting of a reference database, a supplier database, a local database, and a history database.

25. The method of claim 20, wherein the match templates may be reused for multiple input files.

26. The method of claim 20, wherein the match template and the manufacturer name template are further configurable by the user to identify special characters that need to be removed from part information in the input file before using the matching techniques associated with the particular match template.

27. The method of claim 20, wherein the match template and the manufacturer name template are further configurable by the user to identify a maximum number of potential matches per matching technique to be communicated to the user.

28. The method of claim 20, wherein the matching techniques comprise techniques using fuzzy logic.

29. The method of claim 20, further comprising:
using the computer system, receiving a selection of a manufacturer map, the manufacturer map including one or more mappings of one or more input manufacturer names to manufacturer names in the one or more sources of parts data, the manufacturer map including the manufacturer name match template and using the matching techniques specified in the manufacturer name match template to create the mappings; and
using the computer system, using the manufacturer map to identify one or more potential matches between a manufacturer name associated with one or more parts in the input file and a manufacturer name associated with one or more parts identified in the one or more sources of parts data.

30. The method of claim 29, wherein the manufacturer map may be reused for multiple input files.

31. The method of claim 20, wherein the potential matches are communicated to the user after each matching technique specified in a match template is attempted.

32. The method of claim 20, wherein the potential matches are communicated to the user after all matching techniques specified in a match template have been attempted.

33. The method of claim 20, further comprising not attempting to identify potential matches for a part in the input file with a particular matching technique if a part in the one or more sources of parts data having a matching manufacturer name and manufacturer part number is identified using a previous matching technique.

34. The method of claim 20, further comprising receiving, using the computer system, a selection of potential matches for an input file from a plurality of users.

35. The method of claim 20, further comprising saving, using the computer system, the selected potential matches in a revised input file.

36. The method of claim 20, further comprising using the revised input file in a material quotation process using the computer system.

37. The method of claim 20, further comprising:

using the computer system, storing the selected potential matches in a history database; and using the computer system, using the history database as a source of parts data.

38. The method of claim 20, further comprising storing, using the computer system, one or more of the potential matches in a staging table for future access by the user.

* * * * *